United States Patent [19]

Chase

[11] 4,020,135
[45] Apr. 26, 1977

[54] DYEABLE RUBBER PRODUCTS
[75] Inventor: V. Lindsay Chase, Butler, N.J.
[73] Assignee: J. P. Stevens & Co., Inc., New York, N.Y.
[22] Filed: Sept. 29, 1975
[21] Appl. No.: 617,615
[52] U.S. Cl. .................................. 264/78; 8/5; 260/42.21; 260/764; 264/147
[51] Int. Cl.² .................................. D01F 1/06
[58] Field of Search ............... 8/5; 260/42.21, 764; 264/78
[56] References Cited
UNITED STATES PATENTS

| | | | |
|---|---|---|---|
| 1,895,088 | 1/1933 | Taylor | 8/5 |
| 3,126,246 | 3/1964 | Cappuccio et al. | 264/78 |

*Primary Examiner*—James H. Derrington

[57] ABSTRACT

Dye receptive rubber articles are prepared by mixing about 2 to 15 parts by weight of powdered dimethyl terephthalate with 100 parts by weight of rubber and then curing the resulting material. This invention is particularly useful in the preparation of elastic threads which can be incorporated into textile products and then dyed along with the other threads and yarns present in these products.

6 Claims, No Drawings

DYEABLE RUBBER PRODUCTS

BACKGROUND OF THE INVENTION

This invention relates to rubber articles which are receptive to disperse dyes and to the procedure for preparing such dye receptive rubber articles.

Rubber products such as rubber threads are generally not receptive to dyes and coloring of these products is usually carried out by the incorporation of pigments into the rubber composition. However, such a coloring procedure is frequently not economically feasible. For example, when rubber threads are incorporated into textile products, large inventories of rubber goods must be maintained in order to match the many colors that such textile goods are dyed. As a result, the rubber threads are generally used in an undyed or white state and remain white throughout the normal dyeing procedures. When such goods are stretched, the rubber frequently becomes exposed causing "grin through" or exposure of the white rubber threads.

The above problem can be overcome by making the rubber dye receptive. This must be accomplished without deteriorating the physical properties of the rubber. Thus, for instance, rubber can be made dye receptive by the addition of liquid dye carriers. However, the addition of such compounds makes the rubber sticky and otherwise diminishes the properties of the rubber.

SUMMARY OF THE INVENTION

In accordance with the present invention rubber articles, such as rubber threads, which are receptive to disperse dyes are prepared by adding powdered dimethyl terephthalate to the rubber composition prior to curing. The rubber composition is then formed into shaped articles such as thin sheets and cured. The resulting rubber material is receptive to disperse dyes and when combined with other normally dye receptive textile materials to form a stretch product, the entire product can be dyed the same color in one operation.

DETAILED DESCRIPTION OF THE INVENTION

Rubber compositions are prepared, preferably containing about 2 to 15 parts by weight of powdered dimethyl terephthalate for each 100 parts by weight of rubber. Generally, a minimum of about 2 parts by weight of dimethyl terephthalate are required to obtain satisfactory dyeing while the use of more than about 15 parts by weight of dimethyl terephthalate diminishes the physical properties of the product.

The rubber composition also includes a curing system for the rubber which can be any of the curing systems commonly used for the particular rubber employed. Typical of such curing systems is a combination of sulfur, zinc oxide, a fatty acid such as stearic acid and an accelerator such as mercaptobenzothiazole.

The composition can also contain additives commonly used in rubber compositions, for example, antioxidants, such as t-butyl catechol, hydroquinone monobenzyl ethers and dilaurylthiopropionate: materials to prevent cracking such as waxes: and fillers such as silica. The rubber can be natural rubber or a synthetic rubber such as polyisoprene, butadienestyrene and butadiene-acrylonitrile. After all the components of the composition have been mixed together, the composition is formed into a shaped article such as a thin sheet and is cured by the usual procedures. The cured product can be readily dyed with disperse dyes employing the usual dyeing procedures. Examples of suitable disperse dyes are:

Palanil Blue R (Color Index No. — Disperse Blue 56)
Celliton Fast Yellow GA (Color Index No. — Disperse Yellow 3)
Celliton Fast Blue AF (Color Index No. — Disperse Blue 9)
Celliton Fast Blue FBBN (Color Index No. — Disperse Blue 3)
Celliton Scarlet B (Color Index No. — Disperse Red 1)
Palanil Yellow 3G (Color Index No. — Disperse Yellow 64)

In a particularly useful embodiment of the present invention a thin sheet of cured rubber is prepared and then slit into narrow strips or threads. Such threads are then used in one of the well-known stretch fabric constructions wherein the exposed surfaces are made of readily dyeable textile materials such as polyester, nylon, acrylic, acetate and triacetate yarns. When the stretch fabric is dyed with a disperse dye, the rubber thread dyes along with the other components of the fabric. The dyeing of the rubber threads eliminates the problem of "grin through" caused by the exposure of undyed rubber threads upon stretching or distorting the fabric.

EXAMPLE

Three rubber compositions were prepared by mixing 5, 10 and 15 parts by weight of powderered dimethyl terephthalate with the following:

|  | Parts by Weight |
| --- | --- |
| Pale crepe | 100.0 |
| T-butyl catechol | 0.85 |
| Benzothiazyl disulfide | 0.6 |
| Mercaptobenzothiazole | 1.0 |
| Wax | 0.5 |
| Stearic acid | 1.0 |
| Titanium dioxide | 16.45 |
| White hydrated silica | 5.0 |
| Zinc oxide | 5.0 |
| 4,4' dithiodimorpholine | 1.2 |
| Sulfur | 0.6 |

The compositions were then rolled into thin sheets and cured. The cured sheets were slit to form rubber threads, all of which were found to possess good physical properties. Samples of each type of thread were dyed with each of the following disperse dyes: Palanil Blue R, Palanil Yellow 3G, Celliton Fast Blue AF, Celliton Fast Blue FBBN, Celliton Fast Yellow GA and Celliton Scarlet B. Excellent dyeing was obtained with all of the samples.

It will be apparent that many modifications and variations can be effected without departing from the scope of the novel concepts of the present invention and the illustrative details disclosed are not to be construed as imposing undue limitations on the inventions.

I claim:

1. A process for dyeing rubber with a disperse dye comprising mixing 100 parts by weight of uncured rubber with from 2 to 15 parts by weight of powdered dimethyl terephthalate, curing said rubber and contacting said cured rubber with a disperse dye.

2. A process as claimed in claim 1 wherein said rubber is selected from the group consisting of natural rubber, polyisoprene, butadiene-styrene and butadiene-acrylonitrile.

3. A process for rendering rubber receptive to disperse dyes comprising mixing 100 parts by weight of uncured rubber with from about 2 to 15 parts by weight of powdered dimethyl terephthalate, forming said mixture into a shaped article and curing said rubber.

4. A process for preparing rubber threads which are receptive to disperse dyes comprising mixing 100 parts by weight of uncured rubber with about 2 to 15 parts by weight of powdered dimethyl terephthalate, forming the mixture of rubber and dimethyl terephthalate into thin sheets, curing the rubber in said sheets and slitting said sheets to form threads.

5. A process as claimed in claim 4 wherein said rubber is selected from the group consisting of natural rubber, polyisoprene, butadiene-styrene and butadiene-acrylonitrile.

6. A dye receptive rubber article comprising a mixture of 100 parts by weight of rubber and about 2 to 15 parts by weight of powdered dimethyl terephthalate.

* * * * *